Feb. 24, 1953 M. A. TOWNSEND 2,629,842
CONSTANT VOLTAGE GLOW DISCHARGE CONTROL DEVICE
Filed July 12, 1949 2 SHEETS—SHEET 1

INVENTOR
M. A. TOWNSEND
BY
ATTORNEY

Feb. 24, 1953 M. A. TOWNSEND 2,629,842
CONSTANT VOLTAGE GLOW DISCHARGE CONTROL DEVICE
Filed July 12, 1949 2 SHEETS—SHEET 2

INVENTOR
M. A. TOWNSEND
BY

ATTORNEY

Patented Feb. 24, 1953

2,629,842

UNITED STATES PATENT OFFICE 2,629,842

CONSTANT VOLTAGE GLOW DISCHARGE CONTROL DEVICE

Mark A. Townsend, Murray Hill, N. J., assignor to Bell Telephone Laboratories, Incorporated, New York, N. Y., a corporation of New York Application July 12, 1949, Serial No. 104,264

6 Claims. (Cl. 315—326)

This invention relates to glow discharge devices and more particularly to such devices for constant voltage control.

In certain electrical control circuits, a voltage reference element is required for comparison of voltages. Such a circuit might be for automatic charging of batteries, as in telephone substations, by a charging rectifier circuit when the battery voltage is below a predetermined magnitude. Comparisons have been made to other batteries but these have the disadvantages of short and sometimes unpredictable life, especially where high ambient temperatures are encountered. It is therefore desirable to use cold cathode tubes with high voltage stability characteristics.

Glow discharge tubes are themselves however subject to certain factors affecting voltage stability. These factors may cause erratic changes, oscillations, or a steady drift in glow voltage, that is the voltage between the anode and cathode during operation. Thermal changes are also liable to affect the voltage stability of a tube. Voltage oscillations have been traced to glow at the anode and can be eliminated by providing sufficient anode area, proper gas pressure and positioning of the anode in the Faraday dark space to eliminate the positive column, as disclosed in the application of Wallace A. Depp, Serial No. 17,522, filed March 27, 1948, now Patent 2,507,696, issued May 16, 1950.

Erratic and sudden changes in tube voltage, by as much as a volt or more, can occur even though the current through the tube is kept constant. Instability of this type can be correlated with a shifting of the position of the glow on the cathode surface; different tube voltages correspond to different positions of the glow. One suggested method of correcting this difficulty is to make the cathode surface perfectly uniform and place it symmetrically with respect to the anode so that the same glow voltage occurs no matter what portion of the cathode surface is being used. However, even if such initial uniformity of cathode surface were possible, the unused portions of the cathode tend to become contaminated in the presence of a glow in the tube. Contamination of the cathode surface also is a factor in the steady decrease or increase of the tube voltage with time.

One object of this invention is to substantially eliminate voltage variations in voltage reference glow discharge tubes.

It has been found that erratic changes in voltage due to shifting of the glow may be eliminated if the tube is operated at a current that is sufficiently large so that the cathode area is completely covered with glow, that is, operated in the so-called "abnormal" glow region. However, with increase of current in the region of "abnormal" current density, it becomes difficult to confine the glow to the desired cathode surface area. Increase in current may cause the glow to spread to other regions of the cathode which were too inactive or too remote to be reached at lower currents. These areas may cause the same erratic performance as is encountered in tubes operating in the normal glow region.

It has been found also that with a fixed value of tube current the voltage may still continuously increase or decrease with time, the rate of change being as great as a few volts per hour or as small as a tenth of a volt per thousand hours. Changes of this type are associated with the changes in the purity of the cathode surface. Impurities on the cathode surface are removed by the action of the glow discharge, normally resulting in a decrease in tube voltage. However, impurities are present in the gas and are given off by the tube envelope and internal parts which are taken up by the cathode surface, tending to increase the tube voltage. Thus the tube voltage at any time is in part the result of an equilibrium between the processes of contaminating and cleaning the cathode. Even though the materials used in constructing the tube are as clean as possible and the greatest care is used during the exhausting of the tube, the cathode becomes contaminated.

In accordance with one feature of this invention, a glow discharge device has essentially plane parallel cathode and anode surfaces so that operation may be had at the lower region of "abnormal" current to limit the glow to the whole area of the cathode surface and thereby eliminate erratic voltage changes.

In accordance with a further feature of this invention, the electrodes are mounted by double lead-in wires, thereby insuring accuracy of mounting and avoiding undesirable bimetallic action.

In accordance with a further feature of this invention, the instability of voltage caused by a slow steady drift is inhibited by subjecting the tube to a precise aging schedule. By giving the tube this prolonged aging, a clean cathode surface is obtained. During such an aging schedule cathode material is sputtered over the inside surface of the glass envelope. Low rates of drift in tube voltage are then obtained when an opaque layer of cathode material has been deposited on essentially all of the glass envelope, thereby inhibiting the rate of evolution of gas from the glass envelope and at the same time trapping impurities before they reach the cathode.

Prior attempts at sputtering of the molybdenum onto the inner glass wall of the vessel have been made using an aging schedule that started before the evacuation process. In such cases very high currents were used and the impurities in the gas pumped out. The gas was then replenished and the procedure continued. Stopping the aging process with this high current while a high temperature condition exists in the device causes also a large evolution of contaminating gases. Further, the use of pumps during the aging process is inefficient and uneconomical for commercial production because of the expense in running high vacuum pumps. Similarly the replenishing of the filling gas of the device is also uneconomical. It is a feature of this invention that the aging process is carried on after the tube is evacuated and without replenishment of the gas by slowly reducing the current, and therefore the heat evolved, so that the rate of cleaning of the device by the sputtering always exceeds the rate of contamination because of the high temperatures. By tapering the currents and properly choosing their durations a short and economical aging process is obtained.

The aforementioned and other advantageous features of the invention will be more readily understood by consideration of the following detailed description and the accompanying drawings, in which.

Figure 1:
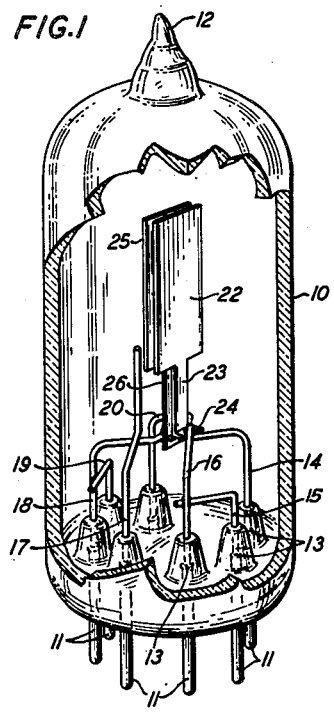
Fig. 1 is a perspective view of a glow discharge device illustrating one embodiment of this invention, a portion of the glass envelope having been broken away to show the internal elements of the device.
Figure 2:
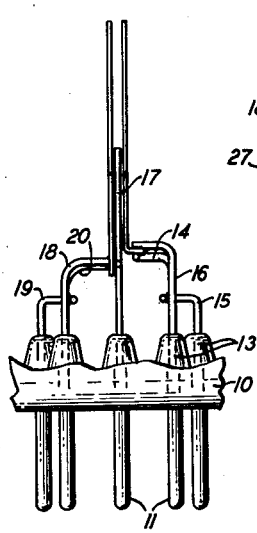
Fig. 2 is an elevation view of the electrode mount of the device of Fig. 1.
Figure 3:
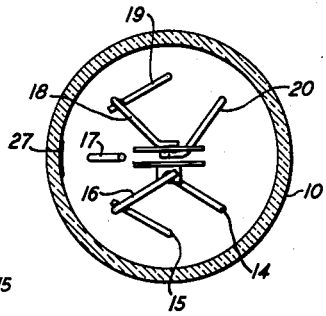
Fig. 3 is a plan view of the device shown in Fig. 1.
Figure 4:
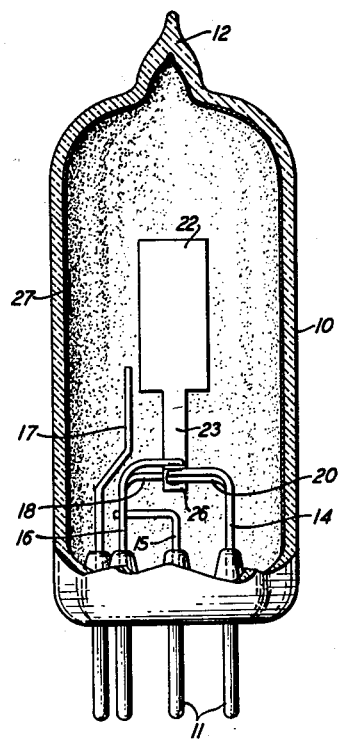
Fig. 4 is an elevation view of the device shown in Fig. 1, a portion of the glass envelope having been broken away, disclosing the internal coating on the glass envelope following the aging schedule.

Referring now to the drawing, the glow discharge device illustrated in Fig. 1 comprises an enclosing glass vessel 10 with base pins or terminals 11 sealed in the base and an exhaust tubulation 12 at its top. The pins 11 are connected in seals 13 to conductors 14, 15, 16, 17, 18, 19 and 20. A rectangular anode plate 22 is supported by the conductors 14 and 16 which are attached to a flange 24 on a tab 23 integral with the anode plate 22. The conductors are attached to the flange 23 on opposite sides, the conductor 14 being attached, as by welding, to the bottom of the flange and conductor 16 attached, as by welding, to the top. Conductor 15 is attached to the conductor 16, as is the conductor 19 to the conductor 18.

A rectangular cathode plate 25 is closely spaced to the anode plate 22 and is preferably the same size. The cathode plate 25 is supported by the conductors 18 and 20 which are connected to opposite sides of a tab 26 integral with the cathode plate 25. The conductor 17 is bent to be positioned adjacent the electrodes 22 and 25 and is the starter anode.

In one specific and illustrative embodiment of this device, the anode and cathode plates are of .010 molybdenum sheet metal, ⅜ inch by $\frac{3}{16}$ inch. Tantalum, columbium or a similar refractory metal may be used. The back side of the cathode, away from the anode, is coated with aluminum powder by a calorizing process to inhibit glow from that part of the cathode. The spacing between the anode 22 and cathode 25 is .020 inch and the tabs 23 and 26 are $\frac{1}{16}$ inch wide. The device has a gas filling of argon at 30 millimeters of mercury, though other gases, such as neon with a small per cent of argon, can also be used. A spot 27 of radium bromide is placed on the inner wall of the envelope 10.

Prior devices constructed with electrodes of nickel rather than molybdenum or the other refractory metals mentioned performed poorly as voltage reference tubes partly due to the difficulties in restricting the glow to a definite cathode area without the introduction of mica or ceramic shields to prevent the glow spreading to the supporting wires and other parts of the device. The shields impose limits on temperatures that can be utilized during the aging process and thus further hampered the proper performance of the device as a voltage reference tube. By the use of these other metals a more severe aging schedule is possible. Further the difference in glow voltage between the conductors 14 through 20, which are preferably of nickel, and these metals keeps the glow entirely on the desired area.

The dimensions of the cathode should be such as to meet prescribed requirements as regards heat dissipation, tube construction, and size of envelope required. The gas pressure is then made such that the cathode is properly covered by glow at the expected operating current. The position of the anode should be such that it is in the second or Faraday dark space; this prevents the formation of any positive column which is undesirable. The first or Crooke's dark space is of negligible dimensions in these devices at the pressures employed and may therefore be ignored in considering their operating characteristics.

By connecting more than one base pin to each electrode a more stable mounting is achieved. The small tabs 23 and 26 to which the nickel conductors are connected, as by welding, further prevent excessive heat conduction to the weld during the processing, to be described further. And by welding a connector on each side of the stem 26 and flange 24, undesirable bending of the electrodes during the processing is avoided. Due to the differences in thermal expansion of the electrode material, preferably molybdenum, and the connectors, preferably nickel, a single connection on the outside of the electrode only would cause the two electrodes to bend towards each other during the exhausting and the aging process.

Figure 7:
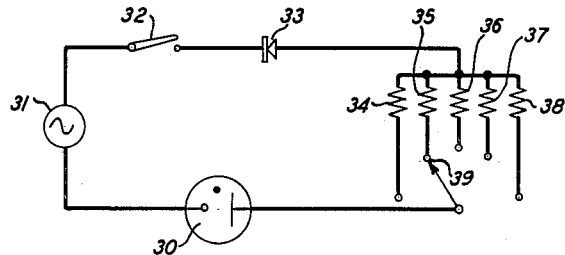
Fig. 7 is a schematic of one aging circuit that may be used in accordance with this invention.

For the device as above described a precise aging procedure is advantageous to substantially prevent voltage variations. After the device is exhausted and filled, it is connected in the circuit of Fig. 7, the device being shown schematically by the tube 30. In series with the tube are a source of alternating current voltage 31, a relay 32, a half-wave rectifier 33, and load resistances 34, 35, 36, 37 and 38.

In accordance with a feature of this invention, the tube is aged by subjecting it to initially high currents for short periods of time on a discontinuous duty cycle and then, by increasing the value of the resistance in series with the device to decrease the current, approaching the operating conditions of the device. An object of the aging schedule is to sputter away impurities that are present on the cathode surface and to trap impurities in the gas or slowly evolving from the tube envelope. Since sputtering by positive ion bombardment increases rapidly as the current density is increased, it is preferable to use a rectified alternating current voltage to provide a high peak to average current ratio. During the initial aging a short duty cycle is used to further increase the peak value to average value ratio and thus to clean the surface rapidly. The high current used during this initial period generates enough heat to release impurities from the tube wall at a high rate. During the remainder of the aging schedule the temperature is reduced while yet maintaining a rate of clean-up in excess of this rate of evolution of impurities.

In one aging schedule in accordance with the principles of this invention, the glow discharge tube is first operated on an intermittent basis, the relay 32 being closed one second and open nine seconds, giving a duty cycle of one-tenth. Subsequently the relay 32 is continuously closed as each of the resistors 34 through 38 are in succession placed in the circuit by a selector 39. Values of load resistance, average current, duty cycle and times that applicant has found satisfactory for one aging schedule are:

| Load Resistance | Value | Av. Current | Duty Cycle | Time |
| --- | --- | --- | --- | --- |
|  | Ohms | Ma. |  | Hours |
| 34 | 50 | 300 | 1/10 | 2 |
| 35 | 100 | 200 | 1/10 | 16 |
| 36 | 1,000 | 35 | Continuous | 64 |
| 37 | 2,000 | 18 | ----do---- | 24 |
| 38 | 4,000 | 10 | ----do---- | 4 |

For this particular illustrative aging schedule an alternating current voltage of 208 volts was employed.

It can be seen that this schedule starts off with very high peak currents and then tapers towards the final operating current. The purpose of this is to keep the cleaning resulting from the glow discharge always at a greater rate than the contamination of the cathode produced by the evolution of impurities from the tube parts.

The attainment of minimum fluctuation and maximum stability of tube voltage drop is dependent upon the treatment given to the work electrodes to attain an utterly clean work surface. The electrodes are therefore cleaned electrolytically and fired in hydrogen at 1200° C. for fifteen minutes. The cathode is also fired in wet hydrogen at 1000° C. for five minutes following the calorizing of the back of the cathode. The aging process further cleans the cathode surface to a completely clean metallic area because the heat evolved by the process is such that the top layer sputters off and is deposited on the glass walls of the tube. This diffusion of metal acts also to clean up deleterious gases in the tube. When the metal is formed on the interior of the glass wall as a black coating of metal it then performs a gettering action, forming a prison for contaminants which might otherwise evolve from the glass walls of the tube and contribute to tube deterioration.

While the opaque material thus deposited on the glass walls covers the spot 27 of radium bromide, this does not affect the starting characteristic of the device as the radon gas present provides initial ionization.

Figure 5:
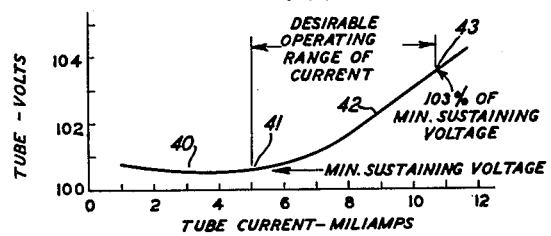
Fig. 5 is a graph of the current voltage characteristic of the device shown in Fig. 1, particularly showing the portion of curve in the "abnormal" region of operation.

In the operation of the tube, the value of current for any given voltage for a particular tube is dependent on the cathode area, the gas pressure and the spacing between the cathode and the anode. Fig. 5 shows a static voltage-current characteristic for the glow discharge device above described and is illustrative of the principles involved in this invention. It is known in the art that the potential drop between the negative electrode and the positive electrode will have a certain normal value. In this portion of normal current density the curve 40 of voltage with respect to current is nearly horizontal. An increase in current produces an increase in the area of the cathode covered by the glow without change of potential drop across the electrodes. When, however, the current is raised to a value at which the cathode is completely covered by the glow a further increase of current produces an increase in tube voltage. In this portion of the curve 42 the voltage increases with increasing current. The abnormal portion of the characteristic may be considered from the position of internal resistance of the tube by considering that the increase in current in turn causes an increase in the internal resistance thereby appearing as a higher voltage drop between the two electrodes. Operation in the abnormal glow region has priorly been suggested to take advantage of this increase of internal resistance as a protective matter, as a glow discharge device having this characteristic of increasing internal resistance may be directly connected to an electric circuit without the interposition of a protective resistance, the increase of current through the device causing a corresponding increase in the potential drop between the two electrodes. However, operation at any point in the region of abnormal glow is not satisfactory for a voltage reference tube. A difficulty introduced by the rising voltage-current characteristic results from the difficulty of confining the glow to a definite cathode area over a range of tube currents. Increase of tube voltage at high currents causes the glow to spread to regions of the cathode that were too remote or too inactive to be reached at lower currents or causes the glow to spread to the cathode leads. These areas cause the same erratic changes in voltage as is encountered in tubes operating in the normal glow region.

However, by providing that the cathode and anode surfaces are essentially plane and parallel, stable operating voltage can be achieved over a range of operating currents. Within this range the voltage of the glow discharge device will remain constant with time for a particular current value. The lower limit of the current for this range is the value at which the cathode is just covered with the negative glow, the point 41 on the voltage-current characteristic of Fig. 5. The actual numerical value of this current for any particular glow discharge device is determined by the cathode area, the filling gas and the filling pressure. It has been found that stable operation cannot be obtained in a voltage reference tube at a current which causes the tube voltage to exceed 103 per cent of the minimum tube voltage, because of the erratic changes in voltage encountered at high voltages when the voltage glow spreads to the cathode leads and other parts of the tube. This is point 43 on the characteristic of Fig. 5, and the desirable range of operating currents is indicated on the characteristic between points 41 and 43. The minimum sustaining voltage is generally not the point 41 but appears to occur at a slightly lower value of current. However, it is not much different and no error would be introduced if the maximum voltage were considered as 103 per cent of the voltage at the point 41, where the cathode is first just covered by the glow. While the actual values of current and voltage that define the desirable operating range for any given tube will vary with the cathode area and configuration and gas pressure of the device, the range of desirable operation is in each case confined to that small portion at the lower end of the abnormal region between where the cathode is first just covered by the negative glow and 103 per cent of the minimum tube voltage.

Figure 6:
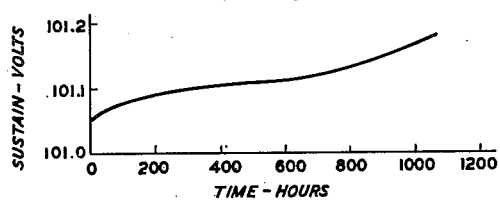
Fig. 6 is a typical performance graph of the device of Fig. 1.

A typical curve of tube performance with life for a tube constructed and operated in accordance with this invention is shown in Fig. 6. The tube was aged in accordance with the process described hereinabove and was operated during the test slightly above the region of normal current density. As is apparent from the graph the variation in voltage was well under 0.2 volt or 0.2 per cent of the tube voltage for a thousand hours of operation. Operation of these tubes also shows sudden erratic voltage variations of less than a few hundredths of a per cent.

Figure 8:
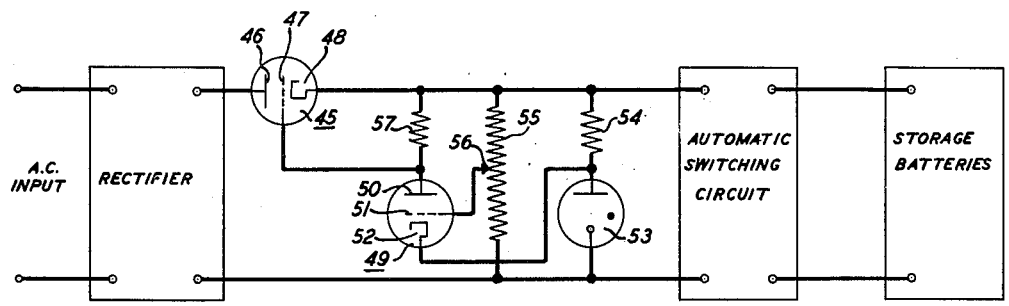
Fig. 8 is a schematic of a battery charging circuit using a voltage reference tube for constant voltage output.

A typical circuit in which a voltage reference tube is used is shown in Fig. 8, which is a regulated rectifier output circuit, such as is used for automatic charging of batteries, as in telephone substations. The circuit comprises a rectifier, a series tube 45, having a plate 46, a grid 47, and a cathode 48, an amplifier 49, having a plate 50, a grid 51, and a cathode 52, and a voltage reference tube 53. The operation of the circuit can be best understood by considering what happens upon decrease of the output direct-current voltage for some reason. The voltage reference tube 53 is connected across the direct-current output with a resistance 54. When the output voltage decreases, the whole decrease appears across the resistance 54, as the voltage of the tube 53 remains essentially constant, a very slight change being due to the change in current. The cathode 52 of the amplifier tube is connected to the plate of the voltage reference tube so that the voltage of the cathode is also essentially constant. The grid 51 of the amplifier tube is connected to point 56 on a potentiometer 55 connected across the direct-current output. The whole voltage decrease appears across the potentiometer 55, and a portion appears at point 56 or on the grid 51. The grid is, therefore, decreased in voltage relative to the cathode 52, which causes a decrease in the plate current through a resistor 57 and an increase in the voltage of plate 50. Plate 50 is directly connected to the grid 47 of the series tube 45 and an increase in the voltage of grid 47 increases the current flowing through the series tube, thereby returning the output voltage to its regulated value.

The storage batteries are connected to the regulated direct-current output through an automatic switching circuit which can either compare the regulated direct-current output with the battery voltage, as shown in Fig. 8, or can compare the ratio between the storage battery and the voltage reference tube.

Reference is made to the copending application of Robert L. Vance, Serial No. 104,255, filed July 12, 1949, in which a related invention is described and claimed, now Patent No. 2,564,040, issued August 14, 1951.

It is to be understood that the above-described embodiments are illustrative of the application of the principles of the invention. Numerous modifications may be devised by those skilled in the art without departing from the spirit and scope of the invention.

What is claimed is:

1. A glow discharge device comprising closely spaced planar electrodes, each of said electrodes having a tab at one end, and a pair of support wires connected to each of said tabs, each wire being connected to a respective side of a tab, whereby motion of the electrode during processing is avoided.

2. A glow discharge device comprising a vessel, closely spaced rectangular electrodes each having a tab at one end, a pair of wire supports connected to each of said tabs, each wire being connected to a respective side of each tab, a glow inhibiting coating on the outer surface of one electrode, and sputtered electrode material on the inner wall of said vessel.

3. A glow discharge device comprising a vessel having a gas filling therein, closely spaced rectangular electrodes each having a tab at one end, a pair of wire supports connected to each of said tabs, said wires being connected to respective opposite sides of each tab, a glow inhibiting coating on the outer surface of one of said electrodes, cathode material on the inner wall of said vessel, and a starter electrode adjacent the gap between said electrodes.

4. A glow discharge device comprising a vessel having argon therein at a pressure of substantially 30 millimeters of mercury, closely spaced rectangular molybdenum electrodes each having a tab at one end, a pair of nickel wire supports connected to each of said tabs, said wires being connected to respective opposite sides of each tab, a glow inhibiting coating on the outer surface of one of said electrodes, and sputtered molybdenum on the inner wall of said vessel.

5. A glow discharge device comprising a vessel, a pair of closely spaced planar electrodes, each of said electrodes having a tab thereon, a pair of support wires connected to each of said tabs, said wires being connected to respective opposite sides of each tab, a glow inhibiting coating on the outer surface of one of said electrodes, and cathode material on the inner wall of said vessel, and means for relatively biasing said electrodes such that the device operates at the lower end of the abnormal glow discharge characteristic, whereby stable control voltage is maintained.

6. A glow discharge device comprising a vessel having a gas filling, a pair of closely spaced planar electrodes, a glow inhibiting coating on the outer surface of one of said electrodes, cathode material on the inner wall of said vessel, and means for maintaining a voltage between said electrodes of from the minimum sustaining voltage to 103 per cent of the minimum sustaining voltage.

MARK A. TOWNSEND.

(References on following page)

REFERENCES CITED

The following references are of record in the file of this patent:

UNITED STATES PATENTS

| Number | Name | Date |
|---|---|---|
| 1,745,756 | Gray | Feb. 4, 1930 |
| 1,829,254 | Asch | Oct. 27, 1931 |
| 2,127,822 | Koch | Aug. 23, 1938 |
| 2,219,195 | Norgaard | Oct. 22, 1940 |
| 2,318,644 | Tubbs | May 11, 1943 |
| 2,338,840 | Eade et al. | Jan. 11, 1944 |
| 2,415,816 | Depew et al. | Feb. 18, 1947 |
| 2,435,475 | Stromeyer | Feb. 3, 1948 |
| 2,438,191 | Slack et al. | Mar. 23, 1948 |
| 2,445,171 | Graff-Baker | July 13, 1948 |

FOREIGN PATENTS

| Number | Country | Date |
|---|---|---|
| 250,510 | Switzerland | July 16, 1948 |